United States Patent
Yamane et al.

(10) Patent No.: US 6,748,643 B2
(45) Date of Patent: Jun. 15, 2004

(54) FRICTION MEMBER MANUFACTURING METHOD

(75) Inventors: Takeshi Yamane, Gunma (JP); Yoshihito Aoyama, Gunma (JP)

(73) Assignee: Nisshinbo Industries, Inc, Tokyo (JP)

( * ) Notice: Subject to any disclaimer, the term of this patent is extended or adjusted under 35 U.S.C. 154(b) by 0 days.

(21) Appl. No.: 10/302,302

(22) Filed: Nov. 23, 2002

(65) Prior Publication Data

US 2003/0097754 A1 May 29, 2003

(30) Foreign Application Priority Data

Nov. 28, 2001 (JP) ........................................ 2001-361923

(51) Int. Cl.⁷ .............................. B23P 25/00; B05D 3/00
(52) U.S. Cl. .................... 29/527.2; 29/527.1; 428/66.2; 523/149; 427/290; 427/292; 427/327; 427/331
(58) Field of Search ............................. 29/527.1, 527.2, 29/527.4; 428/66.2; 523/149; 427/289, 290, 292, 327

(56) References Cited

U.S. PATENT DOCUMENTS

| | | | | | |
|---|---|---|---|---|---|
| 3,033,326 A | * | 5/1962 | Byers | .................... | 188/251 M |
| 4,969,251 A | * | 11/1990 | Burkhart et al. | ........... | 29/527.4 |
| 4,976,800 A | * | 12/1990 | Edwards | ...................... | 156/151 |
| 5,396,972 A | * | 3/1995 | Grele | ..................... | 188/250 G |
| 6,451,872 B1 | * | 9/2002 | Yamane | ...................... | 523/156 |
| 6,612,415 B2 | * | 9/2003 | Yamane | ................. | 192/107 M |
| 2002/0038743 A1 | * | 4/2002 | Yoshimoto | .............. | 188/250 R |
| 2003/0064155 A1 | * | 4/2003 | Yamane | ...................... | 427/314 |

FOREIGN PATENT DOCUMENTS

| | | | |
|---|---|---|---|
| DE | 4314432 | * | 11/1994 |
| EP | 0056918 | * | 8/1982 |
| EP | 1081406 | * | 3/2001 |
| FR | 2646363 | * | 11/1990 |
| JP | 11-181585 | * | 7/1999 |

* cited by examiner

Primary Examiner—David P. Bryant
Assistant Examiner—Eric Compton
(74) Attorney, Agent, or Firm—Muramatsu & Associates

(57) ABSTRACT

To provide a method of manufacturing a friction member with high painting performance in which undesirable matters, which stick to the friction member before painting, are removed, and degreasing and recovery of damaged portions are carried out. In the method of manufacturing a friction member in which a friction material is attached to a metal back plate and they are painted, after the friction material is attached to the back plate, the back plate is treated before painting. The treating prior to painting process may be shot-blasting or coating with phosphate. With this treatment before painting, parting compounds that are adhered when the friction material is attached to the back plate is to be removed; dirty things and attached matters are removed; and flaws due to blasting are recovered, resulting in improved painting performance in adhesiveness.

7 Claims, 2 Drawing Sheets

FRICTION MEMBER MANUFACTURING METHOD

BACKGROUND OF THE INVENTION

1. Field of the Invention

The present invention relates to a method of manufacturing friction members such as brakes and clutch facings, and more particularly, to a method of treating a back plate after a friction material is attached thereto and prior to a painting process.

2. Description of the Related Art

Friction members such as pads for disk brakes, brake shoes and clutch facings are formed by attaching a friction material to a back plate made of ferrous material.

Relative movement added to the friction member pressed with a disk rotor or an opposing clutch plate, and frictional force generated at that moment causes an automobile to be stopped or to be transmitted driving force of an engine to wheels. As a result, considerably large shearing force is generated between the friction material and the back plate. Therefore, strong adhesive force between the friction material and the back plate to bear the shearing force has been required.

FIG. 2 is a flow chart showing a conventional method of manufacturing a friction member. At first, a steel plate as a material is punched out through pressing to form a back plate (#100). A large amount of oil for rust prevention or lubrication is adhered to the work punched out as described above. The oil may reduce adhesive force when a friction material is attached, so that it is washed out with water containing several percent of alkali degreasing agent (#102).

Then, grinding particles are blasted in a shot-blasting process to remove oxide films and burrs at pressing, and the surface of the work is made rough until ten point height of roughness profile (Rz) becomes approximately several micrometers (#104), which allows adhesive area to be increased to improve adhesive strength. In addition, since rust or oxide films on the adhesive face may reduce the adhesive force, the rust and oxide films are removed in the sandblasting process when the face is made rough.

It is also possible to simultaneously perform the degreasing and shot-blasting by adding alkali-degreasing agent to slurry in a wet shot-blasting process.

The back plate, which is made rough, and form which rust, oxide films and the like thereon are removed in the above-mentioned process, is treated with a solution for phosphate coating to form a film of zinc phosphate, zinc phosphate calcium, or the like with the thickness of 3 to 5 $\mu$m on the surface thereof (#106). This film functions together with a primer layer described below to prevent rust. The film is inorganic and the primer layer is organic, so that they cooperate to improve effect on rust prevention.

In order to form a primer layer on the surface of the back plate, firstly, liquid phenol resin diluted with alcohol is applied to the back plate, and then the back plate is fed to a furnace to dry and harden the resin (#108).

Next, a bonding agent is applied to the primer layer (#109), and a friction material is mounted to the layer. Then, the friction material is pressed and heated by a press so as to be attached to the back plate (#110). The friction material is made from mixture of a bonding material, a fiber material and a filling material. As the bonding material, thermosetting resin such as phenol resin and urea resin are used. As the fiber material, organic fiber such as aramid fiber, inorganic fiber such as glass fiber and metal fiber such as stainless steel fiber are adopted. As the filling material, organic powder such as powder obtained by grinding tier rubber, metal pieces or powder made from copper alloy, aluminum, zinc or the like, and inorganic powder or particle such as graphite powder are used. In order to attach the friction material to the back plate, two methods are known. In one method, powder material is preliminarily formed in advance and is pressed to a back plate with heat added to bind the powder material and the back plate with each other. In the other method, powder material itself is mounted to a back plate, and they are pressed with each other while they are heated to bind with each other. In the present invention, any method is available.

After that, the back plate is painted to prevent rust and improve appearance (#112), and excessive painting material stick to the friction face is removed by grinding (#114) to obtain a friction member.

However, in the above manufacturing method, in the pressing process in which a friction material is attached to a back plate, release agent is attached to the back plate; a friction material, which is pressed and heated, melts and is forced out from a clearance between the back plate and a mold; the friction material is caught when the mold is closed; or a part of the friction material scatters before hardened and is attached to the back plate and hardened thereon, which causes dirty things or undesirable matters to stick to the back plate. In addition, in each process, the friction material and the back plate as a work collide with each other, or the work strikes against a wall of a container accommodating the work, which may produce bruises. Further, at the heating, a coating may deteriorate. These may cause problems such as uneven and floating painting films.

SUMMARY OF THE INVENTION

The present invention has been made to solve the above problems and to provide a method of manufacturing a friction member with high painting performance in which undesirable matters, which stick to the frictional member before painting, are removed, and degreasing and recovery of damaged portions are carried out.

To accomplish the above objective, a method of manufacturing a friction member according to the present invention is characterized in that the method comprises the steps of: attaching a friction material to a back plate; treating the back plate with the friction material prior to painting process; and painting at least the back plate.

In the above method, the treating prior to painting process may be shot-blasting, and with this shot-blasting, a surface of the back plate is made rough up to 5 to 50 $\mu$m in ten point height of roughness profile (Rz). In addition, the treating prior to painting process can be coating with phosphate.

Further, in the above method, the treating prior to painting process may be shot-blasting and coating with phosphate after the shot-blasting; after the painting, a friction face of the friction material can be ground; and the painting may be painting with powder coating, and prior to the painting, a friction face of the friction material can be ground.

BRIEF DESCRIPTION OF THE DRAWINGS

The present invention will be more apparent from the ensuring description with reference to the accompanying drawings wherein.

DETAILED DESCRIPTION OF PREFERRED EMBODIMENTS

Figure 1:
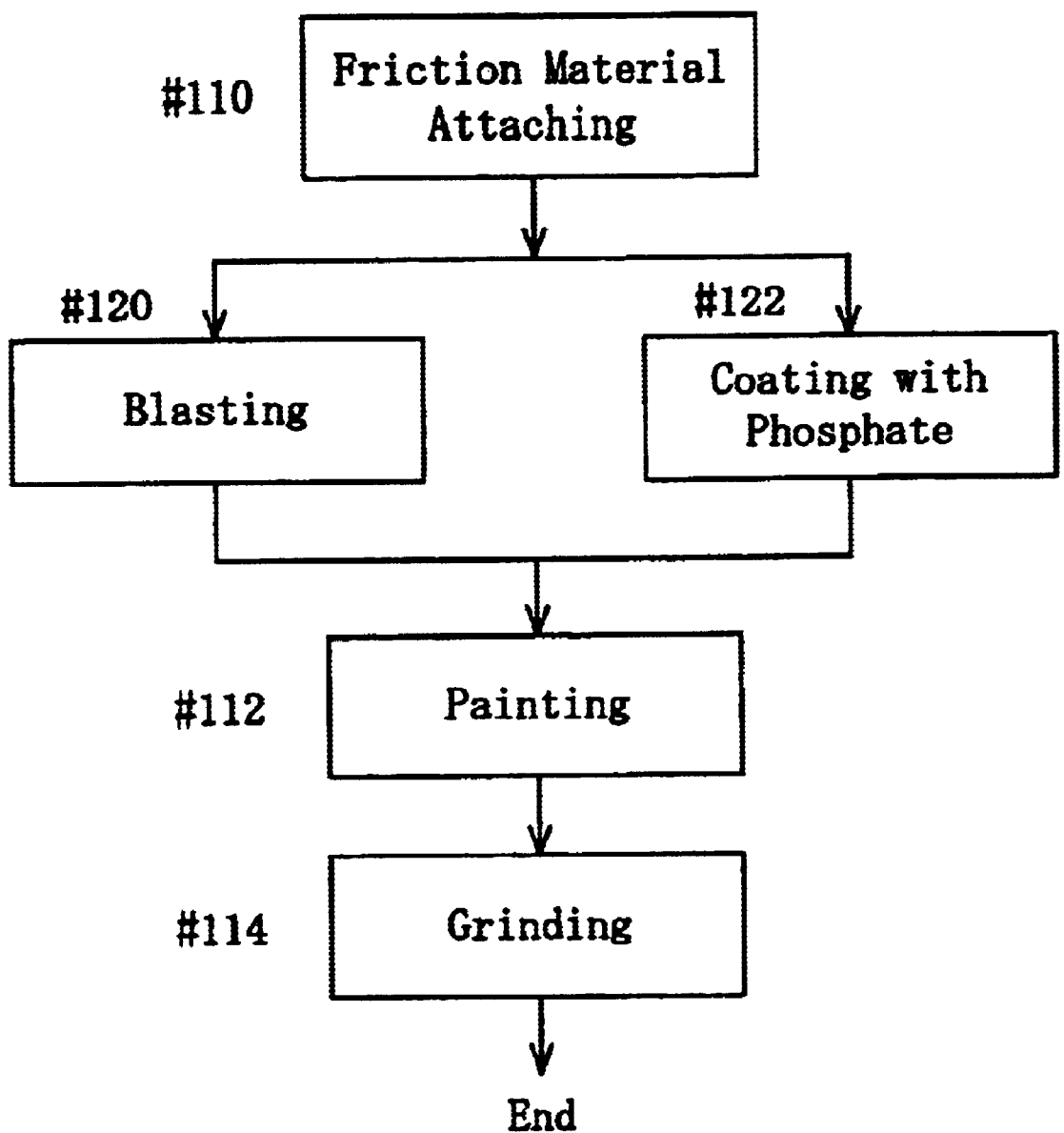
FIG. 1 is a flow chart showing a friction member manufacturing method according to the present invention.

In FIG. 1, processes before the attachment of a friction material (#110) are the same as described above in the description of a conventional method. Immediately after the friction material is attached to the back plate, dirty things or undesirable matters may stick to the back plate; the back plate may be bruised; release agent may attached to the back plate; or the coating film on the back plate may be damaged. When the above problems are left as they are and painting process starts, painting material is not favorably adhered to the back plate, which damages painting performance such as rust prevention and appearance.

Therefore, in the present invention, a treatment is carried out to a friction member in which a friction material is attached to a back plate before painting process. The treatments before painting process are shot-blasting (#120) and coating with a film such as phosphate (#122).

In the blasting (#120) as the first treatment, a back plate as a main part of a friction member is shot-blasted with shot materials such as steel balls, which makes the surface of said back plate rough up to 5 to 50 µm in ten point height of roughness profile (Rz).

It is sufficient to perform the above shot-blasting slightly in comparison to the shot-blasting to the back plate itself that is explained with reference to FIG. 2 since the back plate is subject to the shot-blasting already in #104, and this shot-blasting is carried out to merely peel parting compounds, remove dirty things and attached matters and recover bruised portions when a friction material is attached. For this reason, shot materials are not restricted to hard materials such as steel balls, but shot materials made from synthetic resin such as melamine resin and urea resin are available. In addition, this shot-blasting is not limited to dry method but wet method in which slurry is blasted is usable.

The shot-blasting is unnecessary to the friction face of a friction material. But, in many cases, it is rather difficult to control in such a manner that only the friction face is not subject to shot-blasting. Therefore, whether one likes it or not, the friction face will also be subject to shot-blasting. Usually, the friction face is finally ground and finished in friction member manufacturing process, so that uneven face which is subject to shot-blasting will be ground to be flat.

Figure 2:
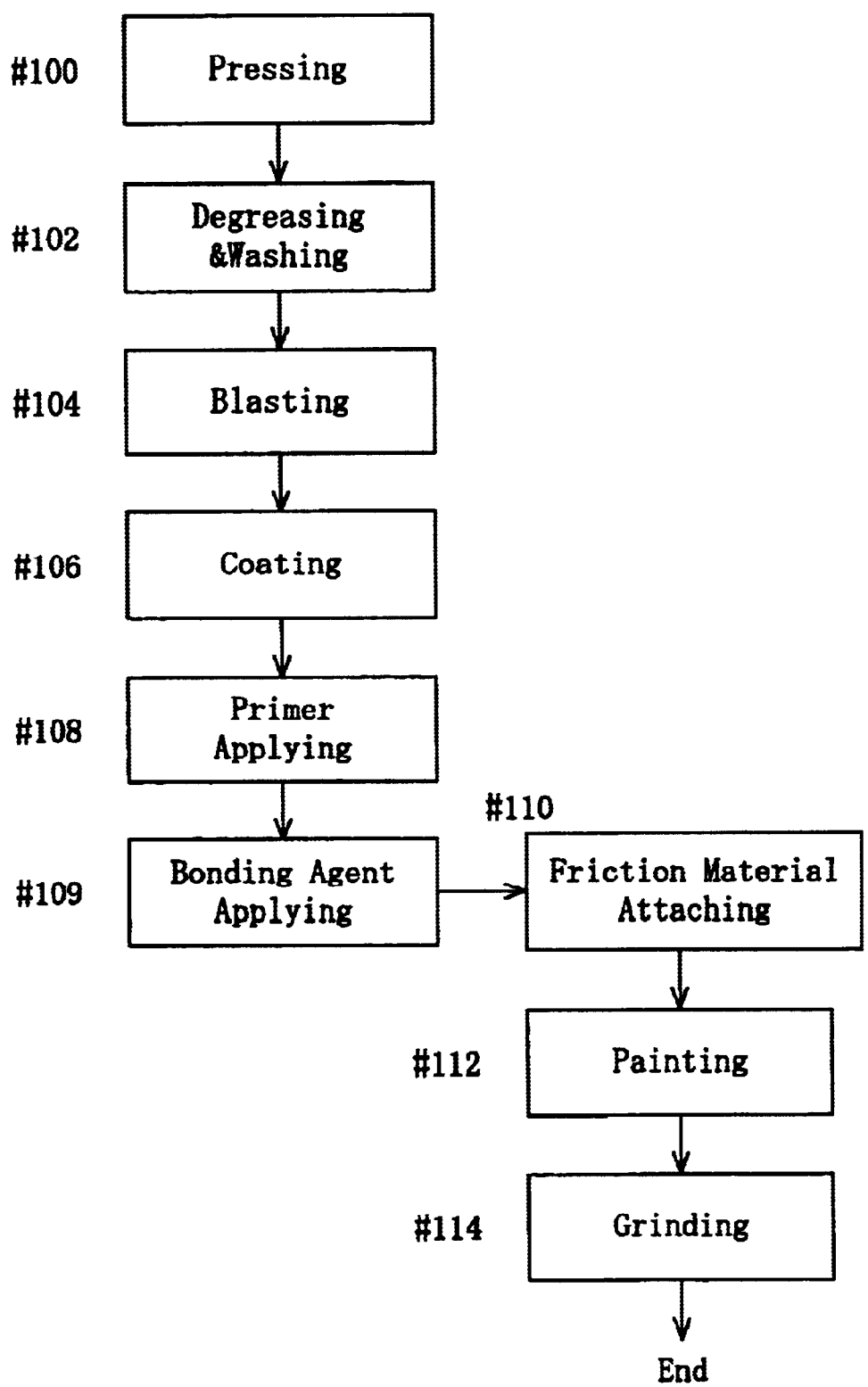
FIG. 2 is a flow chart showing a conventional friction member manufacturing method.

The coating with phosphate (#122), the second treatment before painting, is the same one performed in #106 in FIG. 2, in which a solution for phosphate coating is used. Namely, this process is carried out to recover damaged phosphate coating such as zinc phosphate and zinc phosphate calcium formed in #106 through heat or mechanical contact when a friction material is attached to a back plated through pressing. This recovers rust preventing performance reduced and improves adhesiveness to the painting film.

It is possible to perform the first shot-blasting and the second coating with phosphate prior to painting. In this case, the coating with phosphate should be done after the shot-blasting.

After that, painting is carried out (#112) in the same manner as the above-mentioned conventional method. Painting with powder coating, solvent painting or electrostatic coating can be used. This painting is not required to a friction face of a friction material. However, like the shot-blasting, painting material will intrude on the friction face also, so that the face will be painted more or less. These painting films will reduce the frictional force when used as pads for disk brakes. Therefore, after the painting process, grinding process is added to remove painting films on the friction face (#114). In the grinding process, flaws on the friction face due to shot-blasting are also removed.

In painting with powder coating, in comparison to other painting methods, less painting material attaches to the friction face, so that the painting with powder coating can be performed after finish polishing of the friction face. When a painted face is polished, the painting material will usually clog concave portions of a grinding wheel.

However, with the above method, the clogging of the concave portions can be reduced since the painted face is not polished.

As described above, in a method of manufacturing a friction member in which a friction material is attached to a metal back plate and at least the back plate is painted, after the friction material is attached to the back plate, the back plate is treated. As a result, parting compounds that are adhered when the friction material is attached to the back plate is to be removed, resulting in high painting performance in adhesiveness.

When the treatment before painting is shot-blasting, dirty things and attached matters on the friction member will be removed; and flaws on the back plate will be recovered, resulting in further preferable painting performance in adhesiveness.

What is claimed is:

1. A method of manufacturing a friction member comprising the steps of:
    attaching a friction material to a back plate;
    treating said back plate with the friction material prior to painting process to modify the surface of the back plate; and
    painting at least said back plate.
2. The method of manufacturing a friction member as claimed in claim 1,
    wherein said treating prior to painting process is shot-blasting.
3. The method of manufacturing a friction member as claimed in claim 2,
    wherein said shot-blasting makes a surface of said back plate rough up to 5 to 50 µm in ten point height of roughness profile(Rz).
4. The method of manufacturing a friction member as claimed in claim 1,
    wherein said treating prior to painting process is coating with phosphate.
5. The method of manufacturing a friction member as claimed in claim 1,
    wherein said treating prior to painting process are shot-blasting and coating with phosphate after said shot-blasting.
6. The method of manufacturing a friction member as claimed in claim 1,
    wherein after the painting, a friction face of said friction material is ground.
7. The method of manufacturing a friction member as claimed in claim 1,
    wherein said painting is painting with powder, and prior to said painting, a friction face of said friction material is ground.

* * * * *